(No Model.)

W. S. PENDLETON.
CAR AXLE AND WHEEL

No. 258,109. Patented May 16, 1882.

WITNESSES:
C. Neveux
C. Sedgwick

INVENTOR:
W. S. Pendleton
BY Munn & Co
ATTORNEYS.

UNITED STATES PATENT OFFICE.

WILLIAM S. PENDLETON, OF FORT WORTH, TEXAS.

CAR AXLE AND WHEEL.

SPECIFICATION forming part of Letters Patent No. 258,109, dated May 16, 1882.

Application filed October 25, 1881. (No model.)

*To all whom it may concern:*

Be it known that I, WILLIAM S. PENDLETON, of Fort Worth, in the county of Tarrant and State of Texas, have invented certain useful Improvements in Car Axles and Wheels, of which the following is a full, clear, and exact description.

My invention consists of a car wheel and axle having such construction that when the car is being drawn in a straight course the axle will turn with a positive motion with the wheels, but when rounding curves the axle will be permitted to turn in the journal of the wheel which is upon the inside of the curve, to accommodate the greater speed of the wheel on the outside of the curve, thus overcoming all strain of the wheels upon the axle and the tendency of the car to leave the track in consequence of such strain. The means I employ for accomplishing this result consists principally in providing each end of the axle with a fixed ratchet-wheel and providing the car-wheels with spring-pawls adapted to engage with the ratchets, the car-wheels being placed loosely upon the axle.

Reference is to be had to the accompanying drawings, forming part of this specification, in which similar letters of reference indicate corresponding parts in both the figures.

Figure 1:
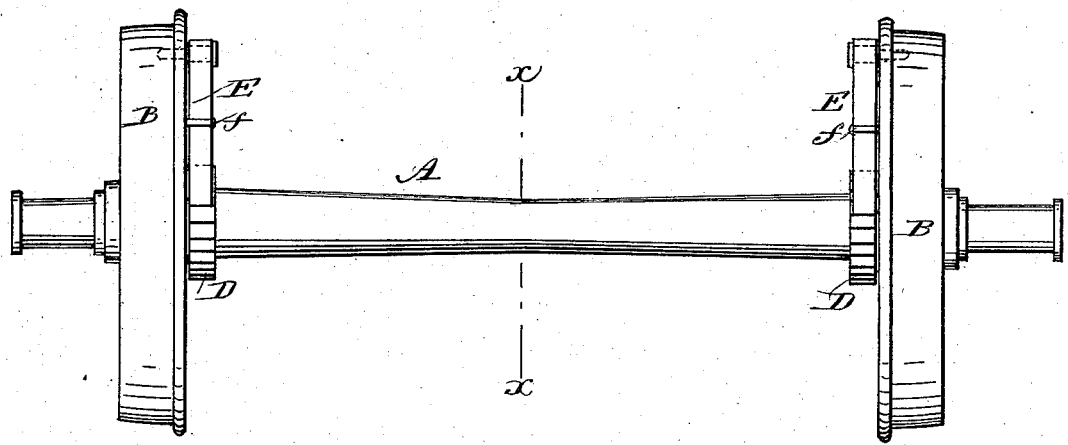
Figure 2:
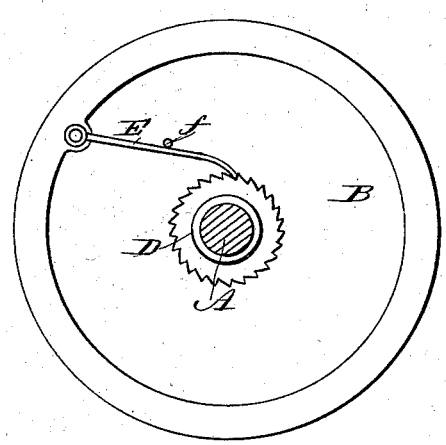

Figure 1 is a front elevation of a car axle and wheels made upon my improved plan; and Fig. 2 is a sectional elevation of the same, taken on the line *x x* of Fig. 1.

A represents the axle, and B B represent the car-wheels, which are loose upon the axle. Upon the axle, near the inner faces of the wheels, are placed the ratchets D D, which are made fast upon the axle. Hinged to the inner faces of the wheels are the spring-pawls E E, which engage with the ratchets D D and lock the wheels and axle together, and cause the axle to turn with the wheels when the car is being drawn forward in a direct line. The pawls are held in constant engagement with the ratchets by means of the pins *f f*, fixed in the wheels, as shown.

Thus constructed and arranged, it will be understood that while rounding curves the wheel upon the outside of the curve will not be retarded by the slower motion of the wheel upon the inside of the curve, as is the case when the wheels are rigidly fixed upon the axle; but the pawl-and-ratchet mechanism will permit the axle to turn in the wheel which has the slower motion sufficient to accommodate the greater speed of the wheel upon the outside of the curve, thus enabling the car to round curves with great ease and without straining the axle, and without tendency to throw the car off the track.

Having thus fully described my invention, I claim as new and desire to secure by Letters Patent—

The combination, with a car-axle having a fixed ratchet-wheel at each end, of wheels arranged loosely thereon, carrying spring-pawls E, and provided with the pins *f*, as and for the purpose specified.

WILLIAM S. PENDLETON.

Witnesses:
   I. CARL,
   SOL. KOHN.